United States Patent [19]
Sawada et al.

[11] 3,936,254
[45] Feb. 3, 1976

[54] APPARATUS FOR THE CONTINUOUS MANUFACTURE OF POLYMER PLATES

[75] Inventors: Teruho Sawada; Takeshi Hirayama; Kenzo Kokubo, all of Osaka, Japan

[73] Assignee: Nippon Paint Company Ltd., Osaka, Japan

[22] Filed: Sept. 16, 1974

[21] Appl. No.: 506,164

Related U.S. Application Data

[62] Division of Ser. No. 344,855, March 26, 1973.

[52] U.S. Cl. .................. 425/89; 118/67; 118/106; 118/324; 425/90; 425/115; 425/224
[51] Int. Cl.² .................................... B29D 7/14
[58] Field of Search ......... 96/35.1, 115 P; 117/65.2; 264/165, 171, 175, 216, 217; 425/115, 89, 90, 224; 118/60, 67, 106, 324, 410

[56] References Cited
UNITED STATES PATENTS

| | | | |
|---|---|---|---|
| 2,060,897 | 11/1936 | Richardson et al. | 118/324 X |
| 2,590,186 | 3/1952 | Land | 264/171 X |
| 3,067,469 | 12/1962 | Yarrison | 425/115 X |
| 3,167,442 | 1/1965 | Brooks | 118/67 X |
| 3,558,380 | 1/1971 | Pook | 425/115 X |
| 3,630,746 | 12/1971 | Takimoto et al. | 96/115 P |
| 3,634,565 | 1/1972 | Schaerer | 425/115 X |
| 3,844,829 | 10/1974 | Block | 117/65.2 X |
| 3,845,182 | 10/1974 | Biskup et al. | 264/216 X |

Primary Examiner—Ronald J. Shore
Attorney, Agent, or Firm—Hume, Clement, Brinks, Willian, Olds & Cook, Ltd.

[57] ABSTRACT

A process and apparatus are provided for making polymer plates that inlcude a uniformly thick layer of a resin composition adhering to a base or support plate. The disclosed process includes the steps of applying a resin composition to a base plate. coating the surface of the resin composition with a sheet of thermoplastic material, rolling the covered resin composition and base plate with rollers, cooling the resultant plate, peeling off the sheet material and then drying the resultant polymer plate.

4 Claims, 4 Drawing Figures

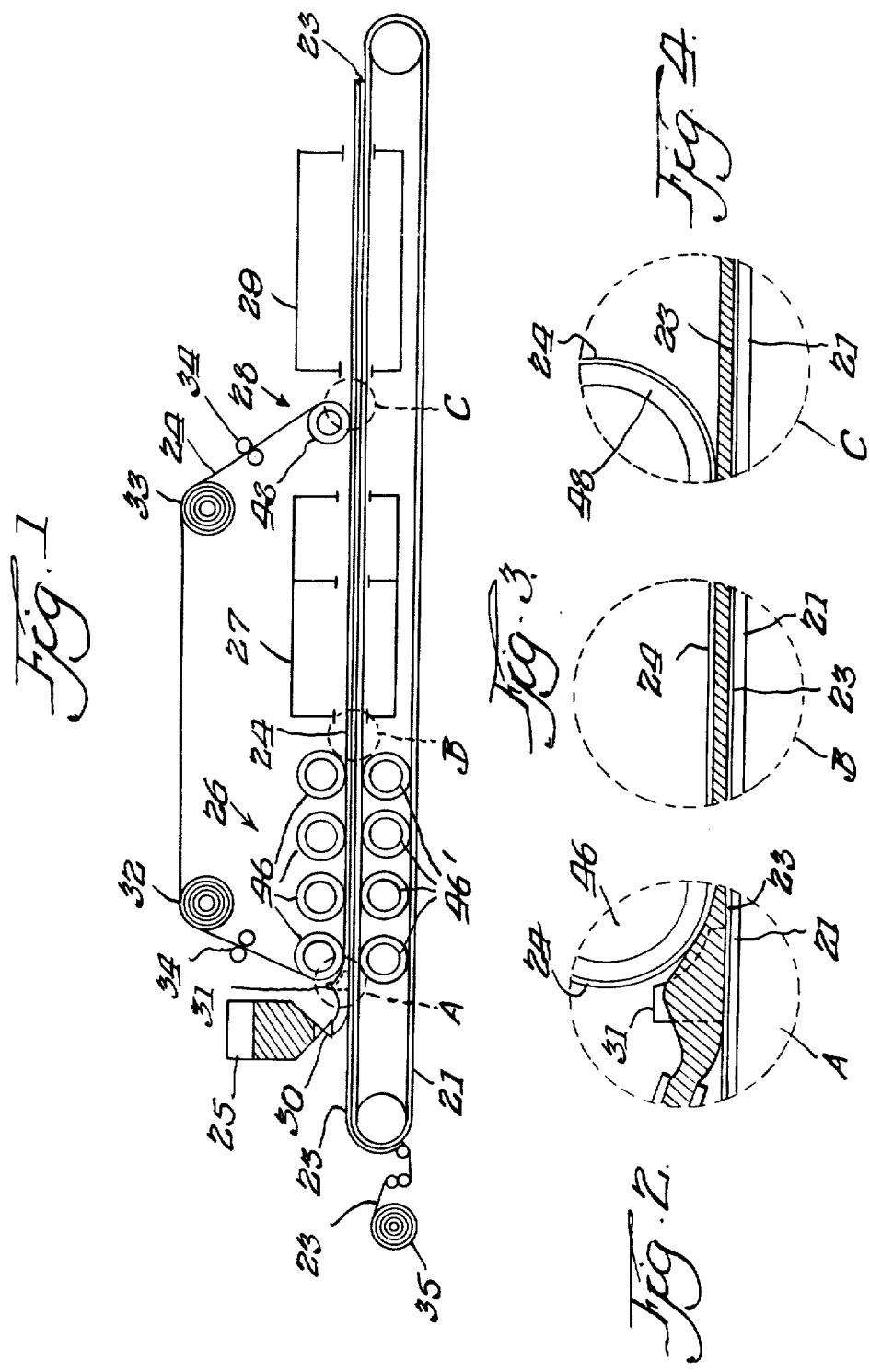

APPARATUS FOR THE CONTINUOUS MANUFACTURE OF POLYMER PLATES

This is a division of application Ser. No. 344,855, filed Mar. 26, 1973.

BACKGROUND OF THE INVENTION

This invention relates generally to a process for making polymer plates and more specifically to a unique process for continuously manufacturing polymer plates having a layer of resin composition that is soluble in water and/or a volatile solvent and is useful, for example, as a photopolymerizable element for a printing plate.

A significant demand has developed in the printing and newspaper industries for photopolymer printing plates, sometimes referred to as cladplates, which include a supporting structure, such as metal, and a photopolymerizable resin composition rigidly secured to the supporting structure. Conventional techniques for making such plates involve the molding, casting, extrusion and/or calendering of the resin composition onto a support structure, such as aluminum, tin or steel. It is known, for example, that resin compositions, having a water soluble or volatile solvent soluble polymer and a monomer compatible therewith as their primary components, can first be molded to form a plate or membrane, and then subsequently adhered onto a base or support plate, such as aluminum, tin or steel plates.

Besides requiring two distinct and, therefore, expensive steps, e.g., molding and then adhering, such techniques are not entirely satisfactory for use with the most desirable types of resin compositions useful as photopolymerizable elements. It has been recognized, for example, that the most desirable types of resin compositions include highly reactive monomer components that are stimulated at temperatures of 80°C or more and, thus, generally cause the resin composition to assume a gelatin condition at commonly used molding temperatures. Conventional molding techniques, therefore, had to be modified to operate at temperatures below 80°C.

In addition, however, when the most desirable types of resin compositions are exposed to air at temperatures above 40°C, their surfaces begin to dry and an undesirable skin is formed on the resin. Thus, conventional molding techniques have the further disadvantage of permitting such air exposure and skin formation on the resin compositions.

Finally, it has also been recognized that the monomer component of such desired resin compositions shifts at temperatures below 20°C and such shifts reduce the adhesion strength of the surface of such resin compositions to the base or support material.

Thus, there is a significant need for polymer plates utilizing such desired resin compositions and for a process for making such plates without the above-mentioned disadvantages of conventional molding techniques.

SUMMARY OF THE INVENTION

According to the present invention, a process is provided for making polymer plates having a layer of uniform thickness of a resin composition soluble in water and/or a volatile solvent at a relatively low temperature, continuously, inexpensively and without the foregoing disadvantages.

A process is provided, therefore, for the continuous manufacture of polymer plates, having a layer of uniform thickness of a resin composition soluble in water and/or a volatile solvent, which comprises applying to a base or support plate, a resin composition containing a polymer soluble in water and/or a volatile solvent and a monomer compatible therewith as its primary components and including water and/or a volatile solvent, coating the surface of the resin with a sheet of thermoplastic material, rolling and then cooling the resin, peeling off the sheet therefrom and then drying the resin which is adhered to the base or support plate.

BRIEF DESCRIPTION OF THE DRAWINGS

The process of the present invention will be better understood through reference to the accompanying drawings in which:

FIG. 1 is a diagrammatic axial sectional view of one example of an apparatus which can be used in practicing the process of this invention;

FIG. 2 is an enlarged view of section A of the apparatus illustrated in FIG. 1;

FIG. 3 is an enlarged view of section B of the apparatus illustrated in FIG. 1; and FIG. 4 is an enlarged view of section C of the apparatus illustrated in FIG. 1.

DESCRIPTION OF THE EMBODIMENTS

Although any number of resin compositions are useful in the practice of this invention, it has been found that a resin having a polymer soluble in water and/or a volatile solvent as one of its primary components is especially useful. Such polymer components include, for example, polyvinyl alcohol, partially saponified polyvinyl acetate, carbonyl polyvinyl alcohol, hydroxyethyl cellulose, methyl cellulose, hydroxypropyl methyl cellulose phthalate, sodium carboxymethyl cellulose, gelatin, polyvinyl acetate, polyvinyl acetal or nylon. The monomer component of the resin which is compatible with the polymer includes an acrylate or methacrylate with a free hydroxyl group in the alcohol component of the esters, (e.g., B-hydroxyethyl acrylate, B-hydroxyethyl methacrylate, B-hydroxypropyl acrylate or B-hydroxypropyl methacrylate, or mixture thereof), or a half-ester of acrylic or methacrylic acid with polyethylene glycol wherein the hydroxyl group opposite the ester component is esterized or etherized (e.g., methoxy polyethylene glycol monoacrylate, methoxy polyethylene glycol monomethacrylate, polyethylene glycol diacrylate, polyethylene glycol dimethacrylate). Water and/or a volatile solvent, for example, a lower alcohol such as ethyl or methyl alcohol, are suitable as their solvents for such resins.

According to the present invention, a polymer plate can be continuously manufactured in either a water soluble type of resin composition or a volatile solvent-soluble type of resin composition. Thus, the process is explained in detail below in relation to the water-soluble type of resin composition (hereinafter referred to as a water soluble resin composition). The water soluble resin composition is used herein to mean a resin composition having as primary components a polymer soluble in water and a monomer compatible therewith and including water (hereinafter referred to as a water inclusive resin composition) from which the water has been removed.

The following is an example of the steps involved in the preparation of the water inclusive resin composition used in the practice of this invention: 40 to 60 parts by weight of a highly reactive and water soluble acryl monomer is added dropwise to 100 parts by weight of a 50 to 70% by weight aqueous solution of a polyvinyl alcohol (degree of saponification: 78 to 98 mole %, average degree of polymerization: 500 to 2000) and then the mixture is mixed in a kneader at a temperature of 60° to 80°C for 30 minutes. After the mixing is completed, the mixture is subjected to defoaming under reduced pressure (liquid temperature: 60° to 80°C). The viscosity of water inclusive resin composition thus obtained is 30,000 to 100,000 cps.

This resin composition is then used in the process of this invention to continuously make a polymer plate. Specifically, the present process for the continuous manufacture of polymer plates having a uniformly thick layer of water soluble resin composition is one that utilizes the variation of the adhesion strength resulting from the variation of heat; and is characterized by applying the water inclusive resin composition heated at about 50° to 70°C to a base plate, and then coating the surface with a sheet material in order to prevent the formation of a skin on the surface of the resin when it is rolled. After coating the resin with sheet material, the resin is rolled to form a uniformly thick layer, cooled to about 20°C or below to reduce the adhesion strength between the surface and the sheet material, after which the sheet material is peeled off the resin. Thus, the present process consists of the continuous steps comprising the application of the water inclusive resin composition to the base plate, the coating of the applied plate with a sheet material, the rolling of the resin into a uniform layer, the cooling of the resultant polymer plate so formed, the removal of the sheet material, and the drying of the resultant polymer plate.

FIG. 1 indicates one apparatus which can be used in the practice of this invention. The illustrated apparatus includes a base plate 23 and sheet 24 which are transported to subsequent processing continuously by a conveyor 21 having a rubber or steel belt. A hopper 25 for containing the resin is provided, along with an assembly for supplying sheet material 24, a means for applying pressure 26, a cooling device 27, a means for peeling off the sheet material 28, and a drying device 29, all of which are arranged in order following the direction of the above conveyor 21. Hopper 25 is provided with a valve 30 that controls the amount of the flow of the water inclusive resin composition in accordance with the width and speed of the base plate. A restraining board 31 is also provided to prevent protrusion of resin from the base plate 23 when it is applied to the base plate. In this way, the resin composition is utilized more efficiently.

Either a long or endless sheet 24 can be used in the apparatus illustrated in FIG. 1. In the case of a long sheet, the sheet material is unwound by the reel-out roller 32 and after adhering to the applied surface and being peeled off by the peeling roller 48 (which is one type of peeling means 28) the sheet material is wound by the reel-in roller 33. Cleansing rollers 34 are furnished both upstream of the reel-out roller 32 and downstream of reel-in roller 33. In all cases, the sheet material 24 operates synchronous to the conveying speed.

A number of individual press rollers 46 are attached above and below the conveyor as the pressing means 26 to press from above and below the water inclusive resin composition inserted between the base plate 23 and the sheet material 24. The press rollers 46 are maintained at a temperature of 60° to 70°C by means of a hot water jacket in order to prevent the lowering of the temperature of the water inclusive resin composition at the time of rolling. These press rollers 46 are natural rollers and have a pressure of 1 to 10 kg/cm$^2$ at the time of rolling. The thickness of the polymer plate made from the base plate, water inclusive resin composition and sheet can thus be varied depending on the number of rollers. When the gap between the upper and the lower rollers is reduced within the scope of 20 to 100 $\mu$ in succession, the thickness of 4 rollers above and below including the base plate can be made within 1000 ± 25 $\mu$. It is also desirable in the practice of this invention to remove air bubbles between the water inclusive resin composition and the sheet material by adjusting the pressure at the time of rolling. Thus, the difference between the gap formed between one pair of upper and lower rollers and that of the next pair of upper and lower rollers determines the pressure at the time of rolling. When the difference of the gaps is increased, air is admitted and the air bubbles become more congested between the sheet and the water inclusive resin composition. It is desirable, therefore, for the gap mentioned above to be 20 to 100 $\mu$. Furthermore, it is possible to obtain polymer plates having a high degree of thickness merely by increasing the number of rollers from 10 to 20. It is possible, for example, to make the thickness of the water inclusive resin composition from 500 to 2000 $\mu$ by adjusting the final rolling rollers.

The cooling device 27 is generally an air circulation style cooling assembly with a 0° to 5°C temperature at the outlet of the air blower. It is typically divided into two chambers, a normal temperature chamber at 10° to 20°C and a cooled air chamber at 3° to 8°C. The use of two chambers prevents water from forming when the polymer plate goes from the cooling device back to room temperature and also reduces the possibility of undesirable effects resulting from the reuse of the sheet material.

Because of the temperature of the resin composition when the sheet material is peeled off, the surface of the resin may have waves. This will generally not occur under normal conditions, but even if it does, the polymer plate can be leveled before the drying process commences.

The drying device 29, which dries the polymer plate after the sheet material is peeled off, is indirectly heated by hot air circulation, so that the ultimate drying temperature is in the range of about 60° to 80°C. Even though the polymer plate is dehydrated and contracts during this process, the final product desired can be easily obtained merely by calculating beforehand the contraction rate and applying the resin composition accordingly. For example, when the polymer plate is dried for 40 to 60 minutes at 80°C with wind speed of 0.5 to 2.0 m/sec, and RH 1%, the contraction rate is 7 to 10%. Since air bubbles will form on the surface of the resin adjoining the base plate when the drying temperature is high, it is desirable that the plate be dried at a temperature below the boiling point of the included volatile component.

It is also preferred that an assembly be provided to regulate the movement of the base plate and sheet material to prevent them from swerving. Moreover, a base plate supply device 35 that supplies the base plate is also provided in the illustrated apparatus.

It should be understood that each of the devices, means and mechanisms described above are linked together and are utilized with the base plate, water inclusive resin composition, and sheet in manufacturing polymer plate continuously.

Thus, the process of this invention for the continuous manufacture of polymer plates having a layer of uniform thickness of a water soluble resin composition can be illustrated through reference to the accompanying drawings.

The water inclusive resin composition prepared on the basis of the example described above is added into the hopper 25 and flowed out in suitable portions onto the base plate 23 by controlling the valve 30. Thus, measured amounts of the resin composition can be applied between the base plate 23 and the sheet material 24 set between the upper and lower press rollers 46, 46'. At this time, the temperature of the water inclusive resin composition is maintained at 50° to 70°C. In terms of limitations of thickness, mechanical properties and prevention of halation, the base plate may be preferably made from steel, aluminum, and other metals, and may even be a long coil plate or cut plate. In the case of cut plate, a sheet of craft paper of a thickness of 80 ± 5 $\mu$ can be used as an under sheet below the base plate and cellophane tape can be affixed between each sheet to make a continuous sheet in order to prevent the water inclusive resin composition from spilling under the base plate. In addition, in order to improve the adhesion of the surface of the base plate 23 to the water inclusive resin composition, the base plate can be sandpolished or pre-coated with an adhesive and then supplied continuously by the base plate supply device 35.

The sheet material covering the surface of the water inclusive resin composition in order to prevent a skin from forming thereon should desirably be a constant thickness and smooth, flexible, tough, and readily removable. For example, a commercially available polyester sheet (thickness, 125 to 250 $\mu$) or a rigid vinyl chloride sheet (thickness, 200 to 300 $\mu$) can be preferably used as a sheet material 24.

The sandwich polymer plate made from the base plate, water inclusive resin composition and sheet is then rolled by passing it between the press rollers 46, 46'. Then the polymer plate of the water inclusive resin composition rolled to the prescribed thickness is conveyed to the cooling device and then cooled. The temperature for the above composition is reduced from about 40°C to 65°C, to approximately 20°C at the time of rolling. Then, the sheet material 24 is peeled off of the cooled sandwich polymer plate by the peeling-off rollers 48. When the polymer plate from which the sheet has been peeled is dried by passing it through the drying device 29, a polymer plate having a layer of uniform thickness of a water inclusive resin composition is obtained. The drying time for the polymer plate will vary according to the thickness and properties of the water inclusive composition, but generally drying can be accomplished in 100 to 120 minutes under the conditions where the thickness of the layer of the water inclusive resin composition is 1.00 mm, the wind speed 1.5 to 2.0 m/sec, and the temperature 78°C.

Finally, polymer plates having the required measurement are obtained merely by cutting the polymer plates obtained above, that is, polymer plates having a layer of uniform thickness of a water soluble resin composition are cut to the required size.

As explained in detail above, according to the process of the invention, there is no need to previously mold the water or volatile solvent inclusive resin composition in the form of a plate or membrane, but instead it is possible, in accordance with this invention, to manufacture polymer plates having a layer of uniform thickness of a resin composition soluble in water and/or a volatile solvent inexpensively and continuously. In addition, this process is especially suited for industrial manufacture of such products as a water soluble photopolymer printing plate for printing material. For example, polymer plates containing, as the water inclusive resin composition, (a) 255.3 parts by weight of 33.6% aqueous solution of polyvinyl alcohol (degree of saponification: 82 mole %, average degree of polymerization: 500), (b) 213.2 parts by weight of B-hydroxyethyl methacrylate, (c) 5.9 parts by weight of benzoin, and (d) 0.01 parts by weight of hydroquinone can be used in the practice of this invention to make excellent photopolymer printing plates.

According to the present invention, polymer plates can be manufactured at the relatively low temperature of 80°C or below, and therefore a resin composition that includes among its components a thermal polymerizable compound can be readily used in the practice of this invention at a temperature below that which will normally cause thermal polymerization. The process of this invention has the further advantages of (a) being readily useable with water inclusive resin compositions, (b) being relatively inexpensive and (c) being capable of making polymer plates that have high adhesion between resin and base plate, and thus forming extremely strong polymer plates.

Although a number of specific embodiments of this invention have been disclosed herein, it should be understood that the present invention is in no way limited by the specific features of the disclosed embodiments. Rather, it is intended that various modifications and equivalents of the disclosed embodiments can be made without departing from the spirit and scope of this invention as defined by the following claims.

I claim:

1. An apparatus for the continuous manufacture of photopolymer printing plates having a metallic support structure and a water-inclusive resin composition in adherent contact therewith comprising: (a) means for containing said resin composition; (b) means for continuously transporting said support structure with respect to said resin containing means to permit the deposit of a layer of resin composition on said support structure; (c) means for applying a continuous sheet of flexible thermoplastic sheet material to the surface of said resin composition; (d) a plurality of successive pairs of spaced apart pressure rollers arranged along the transporting means and disposed on opposite sides of said resin composition layer for applying pressure to said layer of resin composition to uniformly spread said layer over said support structure; (e) means for removing said sheet material from said layer of resin after the application of pressure thereto; (f) means for cooling said layer of resin composition, said thermoplastic sheet material and said support structure; and (g) means for drying said layer of resin composition and said support structure for a time sufficient to firmly secure said layer of resin to said support structure.

2. The apparatus of claim 1 wherein said means for applying and removing the continuous sheet of sheet material to and from the surface of said resin composition is a continuous loop of sheet material suspended by means of a pair of oppositely disposed rollers, said loop of sheet material being disposed along and covering the surface of said resin composition and passing between said plurality of successive pairs of spaced pressure rollers.

3. The apparatus of claim 1 wherein said support structure is a continuous coil of metallic material and said means for continuously transporting said support structure is an endless belt.

4. The appartus of claim 1, wherein the cooling means comprises two separate cooling chambers which can be maintained at different temperatures.

* * * * *